US009808710B2

(12) United States Patent
Ionita

(10) Patent No.: US 9,808,710 B2
(45) Date of Patent: Nov. 7, 2017

(54) USER INTERFACE

(71) Applicant: KING.COM LIMITED, St. Julians (MT)

(72) Inventor: Bogdan Ionita, Bucharest (RO)

(73) Assignee: KING.COM LTD., St. Julians (MT)

( * ) Notice: Subject to any disclaimer, the term of this patent is extended or adjusted under 35 U.S.C. 154(b) by 288 days.

(21) Appl. No.: 14/673,974

(22) Filed: Mar. 31, 2015

(65) Prior Publication Data

US 2016/0291827 A1 Oct. 6, 2016

(51) Int. Cl.
*A63F 13/23* (2014.01)
*G06F 3/0488* (2013.01)
*A63F 13/5378* (2014.01)
*A63F 13/2145* (2014.01)
*A63F 13/53* (2014.01)
*A63F 3/00* (2006.01)
*A63F 13/426* (2014.01)

(52) U.S. Cl.
CPC .......... *A63F 13/23* (2014.09); *A63F 13/2145* (2014.09); *A63F 13/53* (2014.09); *A63F 13/5378* (2014.09); *G06F 3/0488* (2013.01); *A63F 13/426* (2014.09); *A63F 2003/00996* (2013.01)

(58) Field of Classification Search
CPC .. G06F 3/0488; A63F 13/2145; A63F 13/426; A63F 13/53; A63F 13/5378; A63F 2003/00996
See application file for complete search history.

(56) References Cited

U.S. PATENT DOCUMENTS

| 8,628,394 B2 * | 1/2014 | Patnoe | A63F 3/0423 463/10 |
| 2006/0161871 A1 * | 7/2006 | Hotelling | G06F 3/0485 715/863 |
| 2007/0152978 A1 * | 7/2007 | Kocienda | G06F 3/04883 345/173 |
| 2013/0140771 A1 * | 6/2013 | Bullock | A63F 3/0052 273/271 |
| 2013/0231167 A1 * | 9/2013 | Patnoe | A63F 3/0423 463/9 |
| 2014/0198055 A1 * | 7/2014 | Barkway | G06F 3/04883 345/173 |
| 2015/0169130 A1 * | 6/2015 | Gao | G06F 3/0488 345/472.2 |

(Continued)

*Primary Examiner* — Dmitry Suhol
*Assistant Examiner* — David Duffy
(74) *Attorney, Agent, or Firm* — Saul Ewing Arnstein & Lehr LLP

(57) ABSTRACT

A computer-implemented method comprising: storing in a memory information of one or more game objects; causing to be displayed on a user interface of a touchscreen display a game board comprising one or more of said game objects; in response to determining contact or proximity of a selector at a first location of said display, determining by the processor one or more of said game objects stored in said memory that are displayed on and/or proximate to said location; and causing one or more of said game objects that are displayed on and/or proximate to said first location to be displayed on said display in a magnified region at a second location, wherein said second location is spaced from said first location.

19 Claims, 17 Drawing Sheets

(56) References Cited

U.S. PATENT DOCUMENTS

| | | | |
|---|---|---|---|
| 2015/0277760 A1* | 10/2015 | Tagaya | G06F 3/0488 |
| | | | 715/711 |
| 2015/0309693 A1* | 10/2015 | Li | G06F 3/04812 |
| | | | 715/711 |
| 2016/0062573 A1* | 3/2016 | Dascola | G06F 3/0482 |
| | | | 715/810 |
| 2016/0074748 A1* | 3/2016 | Bullock | A63F 3/0052 |
| | | | 273/272 |
| 2016/0171655 A1* | 6/2016 | Homma | G06T 3/4053 |
| | | | 348/222.1 |
| 2016/0378312 A1* | 12/2016 | Katsuyama | G06F 17/21 |
| | | | 715/800 |

\* cited by examiner

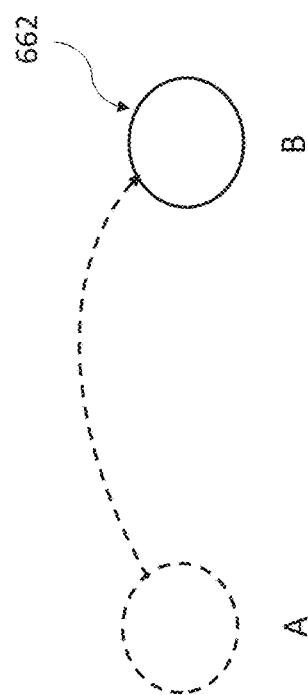
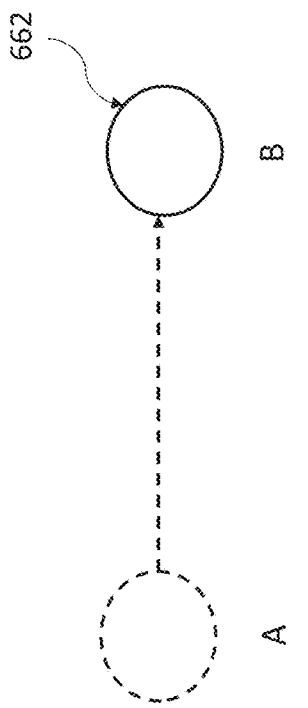

USER INTERFACE

FIELD OF THE INVENTION

Embodiments of this application relate to a user interface. The application is providing but not exclusively directed to controlling the user interface in an online environment by means of a touchscreen.

Some embodiments may relate to engaging users or players in a computer game executable in an online environment.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object. Most commonly, that touch is by a user's finger.

One particular context is that of a computer game where a game board is displayed to a user which has adjacent selectable objects, for example in the form of letter tiles. In one game, the mechanic of the game is that a user should select a set of tiles in succession and thereby form words. The successful delivery of this game depends on the game application being able to generate letter tiles in a way that enables a user to form those words.

One such game is a game called Alphabetty available via the Royal game website (www.royalgames.com). In this game, a user must select adjacent letters to form a word. When a word has been formed, the letters are automatically removed from the screen and letter tiles above the removed letters drop down. New letter tiles are provided to the screen from above to replenish the gaps now left by the tiles which have dropped down.

This patent specification describes not only various ideas and functions, but also their creative expression. A portion of the disclosure of this patent document therefore contains material to which a claim for copyright is made and notice is hereby given: Copyright King.com Limited 2014 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In a first aspect there is provided a computer-implemented method comprising: storing in a memory information of one or more game objects; causing to be displayed on a user interface of a touchscreen display a game board comprising one or more of said game objects; in response to determining contact or proximity of a selector at a first location of said display, determining by the processor one or more of said game objects stored in said memory that are displayed on and/or proximate to said first location; and causing one or more of said game objects that are displayed on and/or proximate to said first location to be displayed on said display in a magnified region at a second location, wherein said second location is spaced from said first location.

According to some embodiments, said magnified region overlies or at least partially overlies said game board.

According to some embodiments, the method comprises texturing said user interface as a series of layers, the game board comprised in a first layer and the magnified region comprised in a second layer.

According to some embodiments, the magnified region is circular or an oval.

According to some embodiments, said first location of said game board is represented at a central position of said magnified region.

According to some embodiments, said method comprises determining a region of said display at least partially visually obscured by said selector, and displaying said game objects displayed in the magnified region outside of said at least partially obscured region.

According to some embodiments, the method comprises determining said second location in dependence on said first location.

According to some embodiments, the game board is determined to comprise a plurality of sections.

According to some embodiments, the second location is caused to be in a section different from a section comprising the first location.

According to some embodiments, the second location is determined to be in a section that is furthest from a section comprising the first location.

According to some embodiments, displaying said magnified region at said second location comprises initiation of said magnified region.

According to some embodiments, the magnified region is moved to the second location from an initial location.

According to some embodiments, the method comprises updating a position of said magnified region on said display in response to movement of said selector over said game board.

According to some embodiments, said updating a position of said magnified region comprises an interpolation technique.

According to some embodiments, the magnified region is caused to move at a variable speed.

According to some embodiments, the method comprises updating a content of said game objects displayed in said magnified region in response to movement of said selector over said game board.

According to some embodiments, said updating a content comprises an interpolation technique.

According to some embodiments, said selector comprises a user's finger or thumb or a stylus.

According to some embodiments, said one or more game objects comprise one or more tiles.

According to some embodiments said one or more tiles comprises one or more letter tiles.

In a second aspect there is provided a computer program comprising computer executable instructions which when run on one or more processors perform the method of the first aspect.

In a third aspect there is provided a device comprising: a memory for storing information of one or more game objects; a touchscreen display for displaying on a user interface a game board comprising one or more of said game objects; a processor; the device configured to, in response to determining contact or proximity of a selector at a first location of said display, determine by the processor one or more of said game objects stored in said memory that are displayed on and/or proximate to said first location; and cause one or more of said game objects that are displayed on and/or proximate to said first location to be displayed on said display in a magnified region at a second location, wherein said second location is spaced from said first location.

According to some embodiments, said device is configured to cause said magnified region to overlie or at least partially overlie said game board.

According to some embodiments, the device is configured to texture said user interface as a series of layers, the game board comprised in a first layer and the magnified region comprised in a second layer.

According to some embodiments, the device is configured to display said magnified region as a circle or an oval.

According to some embodiments, said device is configured to represent said first location of said game board at a central position of said magnified region.

According to some embodiments, the device is configured to determine a region of said display at least partially visually obscured by said selector, and to display said game objects displayed in the magnified region outside of said at least partially obscured region.

According to some embodiments, the device is configured to determine said second location in dependence on said first location.

According to some embodiments, the device is configured to determine the game board as comprising a plurality of sections.

According to some embodiments, the device is configured to cause the second location to be in a section different from a section comprising the first location.

According to some embodiments, the device is configured to cause the second location to be in a section that is furthest from a section comprising the first location.

According to some embodiments, displaying said magnified region at said second location comprises initiation of said magnified region.

According to some embodiments, the device is configured to move the magnified region to the second location from an initial location.

According to some embodiments, the device is configured to update a position of said magnified region on said display in response to movement of said selector over said game board.

According to some embodiments, said updating a position of said magnified region comprises an interpolation technique.

According to some embodiments, the device is configured to cause the magnified region to move at a variable speed.

According to some embodiments, the device is configured to update a content of said game objects displayed in said magnified region in response to movement of said selector over said game board.

According to some embodiments, said updating a content comprises an interpolation technique.

According to some embodiments, said selector comprises a user's finger or thumb or a stylus.

According to some embodiments, said one or more game objects comprise one or more tiles.

According to some embodiments said one or more tiles comprises one or more letter tiles.

BRIEF DESCRIPTION OF DRAWINGS

To understand some embodiments, reference will now be made by way of example only to the accompanying drawings, in which:

FIGS. 7A to 7B schematically show movement of a magnified region, according to some embodiments;

DETAILED DESCRIPTION OF SOME EMBODIMENTS

The techniques described herein may be implemented in for instance a computer implemented tile based word game such as "Alphabetty™" of the applicant, which involves selecting game objects in the form of letter tiles to make words to score points against either a target or another player in a tournament or other multiplayer environment.

In some embodiments, the game may be provided with different levels. Each level may have a specific goal. Each level may have a specific difficulty associated with it. The harder a level, generally the less likely a level is to be completed and/or the greater the required skill of the player.

Figure 1:
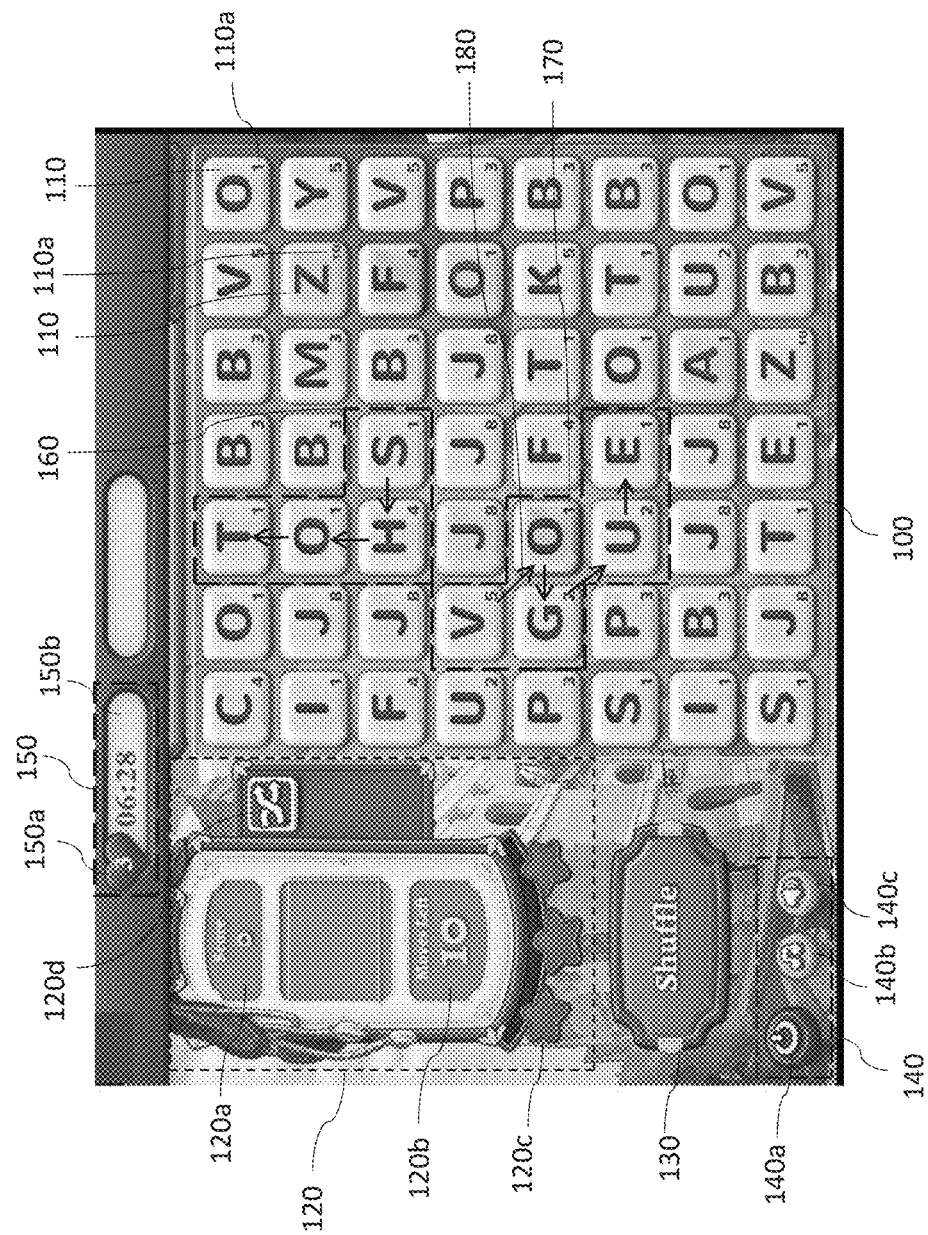
FIG. 1 shows an example embodiment of a game board.

FIG. 1 shows an example game board of a letter tile based computer implemented game according to an embodiment.

The game board 100 or playable area 100 is displayed upon which are disposed game objects or game elements 110. The game objects 110 in this embodiment comprise letter tiles which may have varying characteristics. The characteristics may be one or more of color, shape, and/or different scores 110a per object or tile 110. In this embodiment, the objects 110 are square letter tiles arranged in a rectangular grid like fashion, although in other embodiments other game board configurations and other game object shapes or tiles may be utilized.

A game object may also comprise an "entity" rather than a tile. Whereas a tile may be considered a space on a game board grid, an entity may be considered something that occupies that space.

In some embodiments, "blockers" may be present which may act to block a user during gameplay. The blocker may be a blank tile which cannot be used to form a word, or some form of entity. Such blockers can therefore be used to make a level harder. A blocker may be a permanent fixture in a given level, or may be removable, for example by using adjacent tiles to form a word which tiles are then removed from the game board. An example of a blocker is a "rock-blocker". The blocker may switch position during gameplay or may be fixed in position.

Another type of special object is a "booster". A booster may operate to help increase a user's score, for example by increasing the number of tiles removed from the game board. One example of a booster is a "bomb" tile or entity. The bomb entity may comprise a bomb-shaped icon. The bomb icon may be activated by including it in a word or including adjacent tiles in a selected word. A parameter such as a game target, when reached, may also cause a bomb entity to be activated. When a bomb is activated it may "explode", causing a plurality of adjacent tiles to be removed from the game board, thus increasing the user's score.

There may be different types of exploding entities. For example a "line blaster" is a type of booster whose explosion can be controlled to give extra points whilst destroying other letters on the table. A "flask bomb" on the other hand has a countdown timer and when it explodes it takes away a number of remaining moves (e.g. two moves), but does not remove any tiles from the board. Therefore the "flask bomb" may be considered a type of blocker.

The target may comprise achieving a certain score by selecting tiles 110 to make words, each word scoring a total score at least in part in dependence on each of the individual tile scores 110a selected.

The target may alternatively be to remove one or more specific tiles, make a certain number of words, make a given number (where the number is one or more) of words having a given length or the like, use a particular tile a given number of times (where the number is one or more) or the like. Another example of a game objective includes cheese icons which need to be collected in a "cheese-falls" game mode, the idea being to cause cheese icons to fall off the bottom of the game board by removing lower tiles. It will of course be understood that cheese icons are one example only of the type of icon that could be used in such a game.

The game can in some embodiments end if the player or user runs out of time 150b or runs out of moves 120b before managing to reach a designated target (not shown).

The game board 100 may have a number of game objects 110 having different characteristics 110a aligned in rows and columns, such as a 7×8 grid as shown in FIG. 1. Other grid sizes may be suitable. In such an embodiment the game objects on the game board have three, five or eight nearest or adjacent neighbouring game object tiles. Other game board layouts or configurations may be provided. For example, triangular, pyramidal, hexagonal, octagonal or other layouts comprising position spaces or tiles within the game board 100 may be provided for display.

The game board 100 may be accompanied by a region 120 indicating a current score 120a and a number of moves remaining 120b as shown in the Figure.

There may also be provided control or optional actional items 130, 140, here shown as a shuffle control 130, and a game reset or off control 140a, music 140b and sound or volume control 140c.

The game board 100 may in some embodiments be accompanied by a region 150 indicating a timer or countdown 150b and a number of lives 150a remaining to the player.

The game board 100 shows region 160 in which a word may be formed. For example, region 160 indicates the word S-H-O-T being selected by individual selection of the game objects tiles 110, forming the word "shot" scoring a total of seven points. The forming of the word "shot" here involves only horizontal and vertical movement or selection via touch input.

Game board 100 of FIG. 1 also shows an example region 170 wherein the word "Vogue" is spelled. As can be seen, to create this word scoring 11 points, requires diagonal selection of neighbouring object tiles 100, as shown by arrow 180 indicated in the Figure.

When a word (e.g. "Shot", "Vogue" etc) is spelled, then the letter tiles forming those words are automatically removed from the screen and letter tiles above the removed letters drop down. New letter tiles are provided to the screen from above to replenish the gaps now left by the tiles which have dropped down. New tiles are added to the game board in a manner that ensures that there are letter combinations on the game board that allow one or more words to be spelled by a user, in some embodiments.

Figure 2:
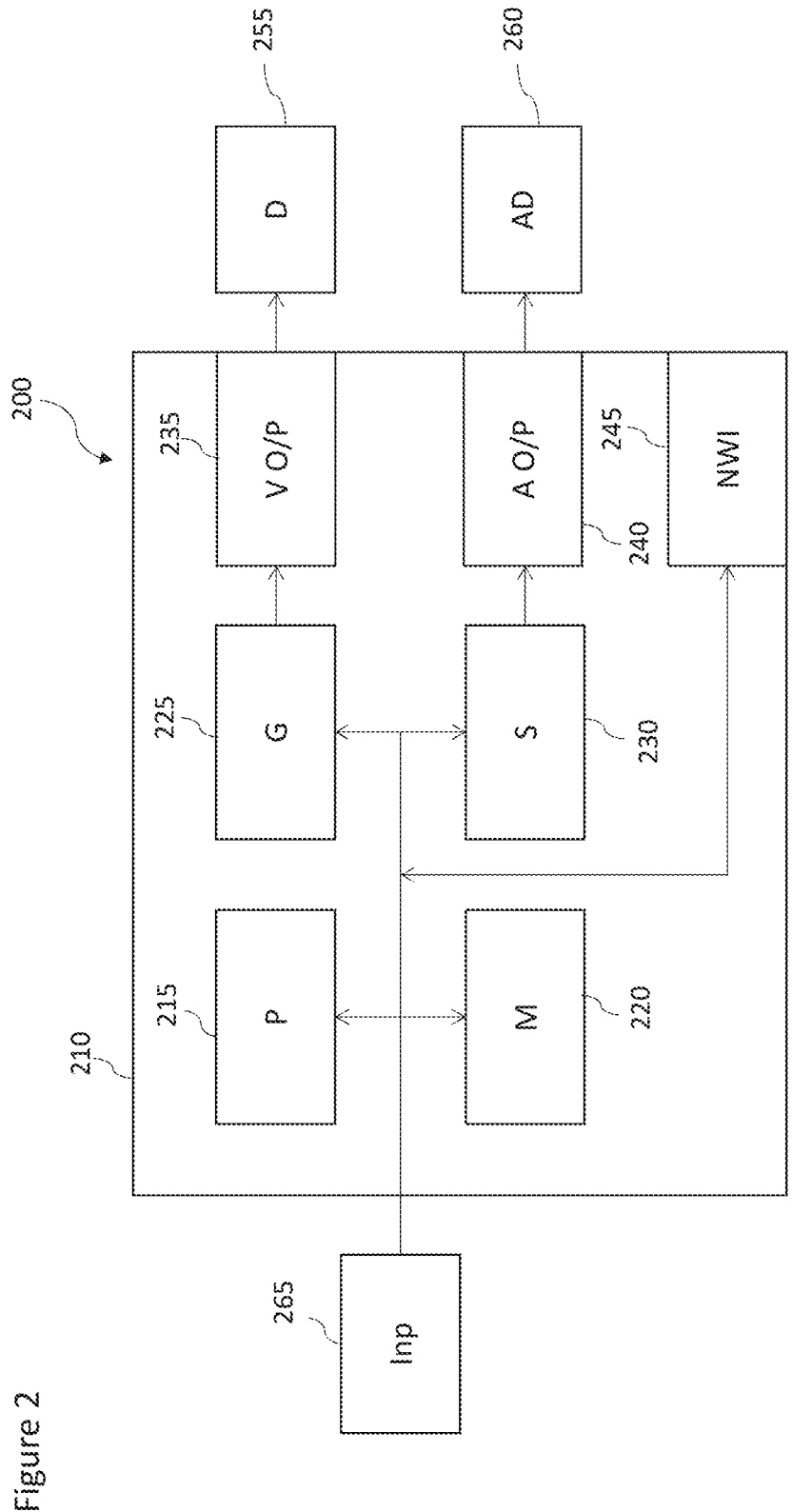
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
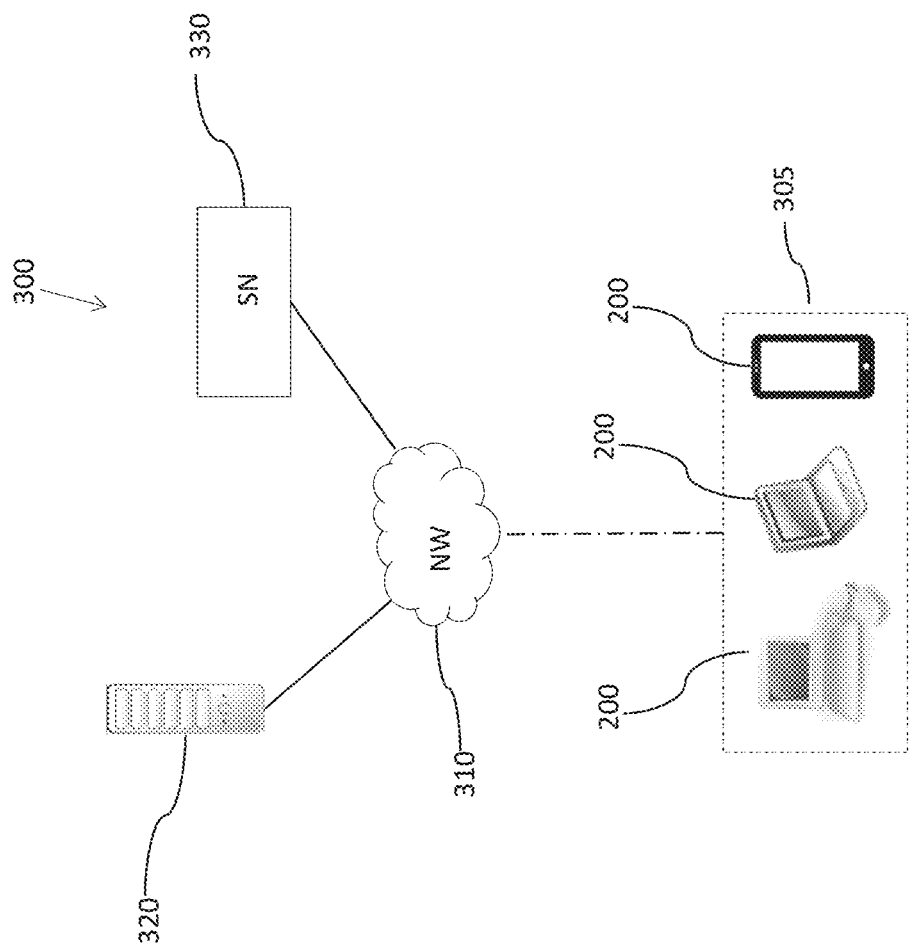
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Some embodiments utilise a dictionary or lists of words containing "valid" words. The dictionary is stored in a memory. In an embodiment, a dictionary comprises a store or list of all valid words that will be accepted during gameplay. When a user spells a word (or attempts to spell a word) on the game board during a game, then the spelled word is compared with the list of valid words contained in the dictionary. If a spelled word is deemed to be valid, then the tiles associated with that word can be removed from the game board and a score can be assigned to the user related to the scores assigned to those particular tiles (plus any bonus points that may be assigned). If it is determined that the word is not a valid word, then no score is assigned to the user and the tiles remain in place. An alert may be provided to the user to indicate that the selected word is invalid. When a game board is initiated or updated during play, then a cross-check with the dictionary may be made to ensure that at least one valid word from the dictionary is comprised in the game board.

Figure 4:
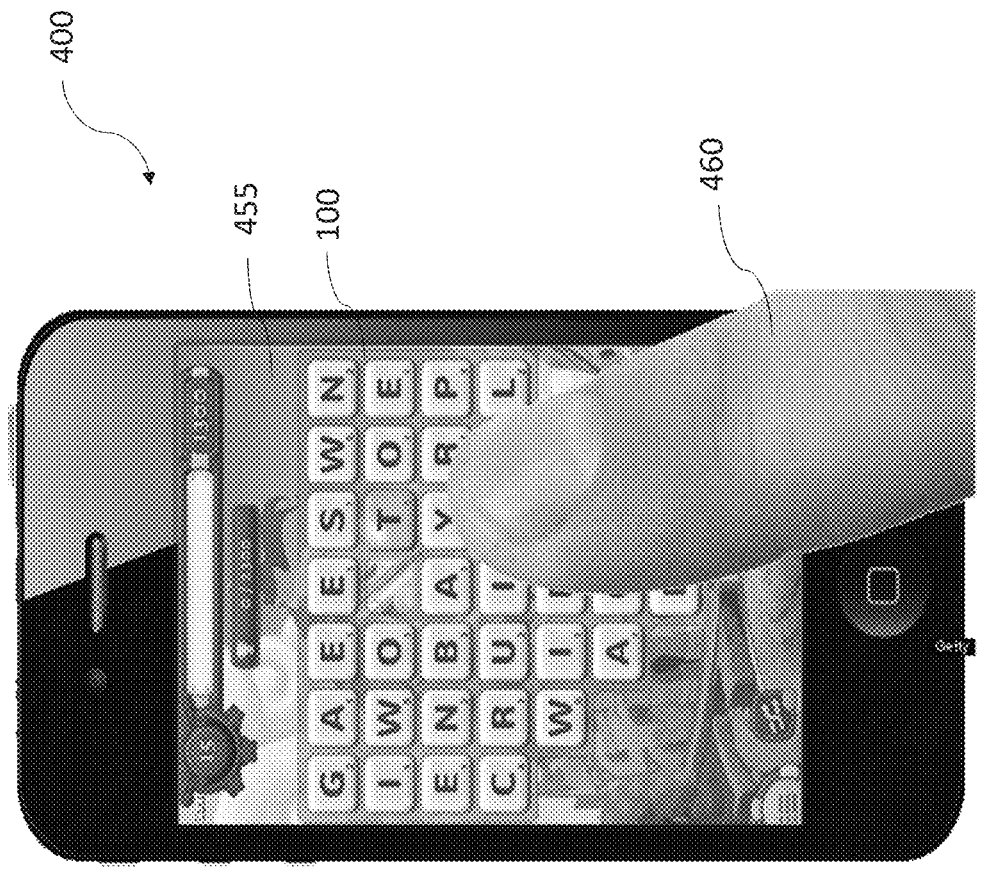
FIG. 4 shows a user device being operated by a user's finger according to an embodiment.

Reference is made to FIG. 4 which shows a user device in the form of a mobile device 400. A game board 100 is shown on display 455 of the mobile device 400. A selector in the form of a user's finger is shown at 460. The term "selector" can apply to any suitable input such as a user's finger or thumb, stylus etc. It will be appreciated that due to the relatively compact dimensions of the display 455 of the mobile device 400, a portion of the game board 100 is obscured by the user's finger 460 during gameplay. This can make it difficult for a user to form words (especially when forming a word in a downward direction on the display 455), since at least a portion of the letter tiles on the game board 100 are obscured from the user's view.

Although a user's finger has been described with respect to FIG. 4, it will be appreciated that embodiments are applicable to the use of any kind of selector for controlling or touching the display 455. For example the selector could also be a stylus or any implement suitable for controlling the display. Although a user may typically use their index finger for controlling the screen, a user may also use any other finger or their thumb. Therefore where reference is made to a user's finger or fingertip it will be appreciated that this could equally apply to any other kind of selector.

Figure 5:
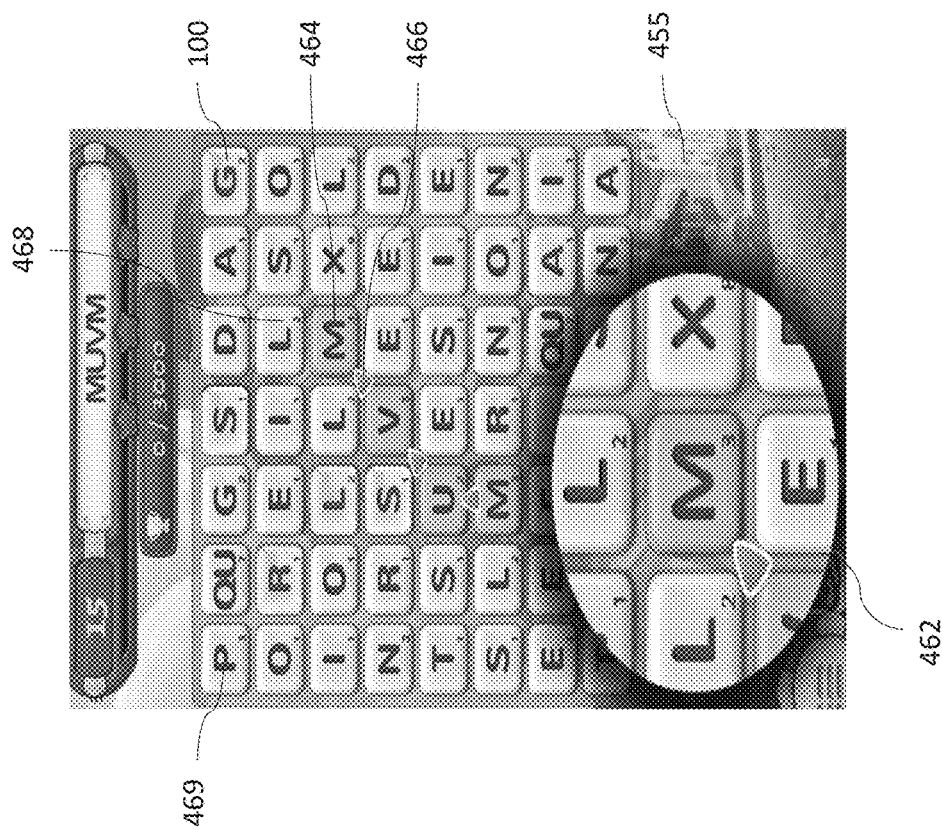
FIG. 5 shows a user interface according to an embodiment.

FIG. 5 shows an embodiment where an enlarged or magnified region or window 462 is provided. In embodiments the magnified region 462 is displayed in the manner of a magnifying glass e.g. a circular or ovalised magnified region. Throughout the application terms such as "magnified region", "magnified area", "enlarged region", "enlarged area", "magnifying glass" etc. can be used interchangeably. In embodiments the magnified region 462 magnifies an area of the game board 100 that is in proximity to a tip of a user's finger, or any other type of selector. For clarity the user's finger is not shown in FIG. 5, but it will be appreciated that in this example a tip of the user's finger (or another part of the user's finger which is touching or proximate to the display 455) is in a location or region of letter tile 464 i.e. the letter tile "M" surrounded by the letter tiles L, S, X, E, E, V, L, I. In embodiments the game objects shown in the magnified region are a copy of the game objects from which the content of the magnified region originates (e.g. the area of the game board in proximity to the user's finger). That is the game objects to be magnified remain in their original location on the game board (albeit obscured or partially obscured by the user's finger), whilst also then being displayed in the magnified region. In this embodiment, the tile closest to the user's fingertip is positioned in a central location of the magnified region 462. As the user's fingertip moves across the game board 100 then the content displayed in the magnified region can be correspondingly updated. During movement of the magnified region, the "current" tile closest to the user's fingertip is displayed as the tile centrally located in the magnified region 462.

To this end a position of a user's finger relative to the display 455 and game board 100 may be detected. This may be by detecting touch of the user's finger on the display 455, or detecting proximity of the user's finger to the display 455. This detection can be carried out in any known way, according to particular embodiments. The detection method may be different depending on the type of device. For example the detection method may differ dependent on whether the device employs a resistive touch screen or a capacitive touchscreen (or indeed any other type of touchscreen). For example in FIG. 5 it is determined that a user's finger is touching letter tile 464, or is hovering closely above it. Display of the magnified region 462 may be initiated in response to determining contact or proximity of a selector 460 to the game board. In this embodiment the magnified or enlarged area 462 is configured to display the letter tiles which are above, below and to the left and right of the selected letter tile. This is by way of example only and the magnified region 462 may be reduced or increased in size. For example the magnified region 462 may be increased in size so as to also fully display the letter tiles positioned diagonally relative to the selected letter tile 464.

In FIG. 5 the magnified region 462 is circular in shape. It will be appreciated however that the magnified region 462 can be of any shape, including square, rectangular, diamond shaped etc.

The game board may also comprises arrows or pointers e.g. pointer 466 which shows a user the direction of the letter tiles selected in the word that they are forming.

The magnified region 462 is configured to be located on the display so that the magnified region is not itself obscured by the user's finger. In other words the magnified region 462 is positioned at a location that is spaced from the location selected by the user's finger (in this case tile 464). In some embodiments a determination may also be made as to the size of the user's finger. For example it may be determined whether a user has a particularly thin finger or a particularly large finger, and the magnified region can be sized and/or located accordingly.

In embodiments the content displayed within the magnified region 462 is updated as the user's finger moves across the game board 100. In embodiments this occurs in real-time. Therefore the content of the magnified region 462 can be seen to update as the user's finger moves. For example, if the user's finger is moved so as to select a letter tile 468 (where tile 464 was the previously selected tile), then the content of the magnified region will update accordingly. That is the letter "L" in tile 468 will become the selected letter and the letter within the centre of the magnified region 462. If the user's finger is moved so as to select a letter tile 469 (where another tile was the previously selected tile), then the content of the magnified region will update accordingly. That is the letter "P" in tile 469 will become the selected letter and the letter within the centre of the magnified region 462 will be a "P". In some embodiments, a portion of the magnified region 462 is left blank. This may be the case for example when the selected tile is at the edge of the game board. For example there are no tiles to the left of or above tile 469. Therefore tile 469 may be located centrally in magnified region 462, with blank spaces to the left and right thereof. In other embodiments, the selected tile may be offset from the centre of the magnified region 462. This may reduce or eliminate blank areas.

In embodiments the content of the magnified region updates in a fluid manner as the user's finger moves over the game board. That is as mentioned above, in embodiments the content of the magnified region may update in real-time, and doesn't "snap" from the originally selected tile to the finally selected tile. As mentioned above, in at least some embodiments the location at which the tip of the selector is positioned on the game board is represented at a central location in the magnified region 462. In some embodiments a determination is made as to which tile is closest to the tip of the selector, and that tile is chosen to be centrally located in the magnified region 462. This may be utilised for example when a user's finger is between tiles.

In embodiments the magnified region is configured to move away from a user's finger as the user's finger moves on the game board, if required. This may happen when it is determined that the magnified region 462 needs to move because otherwise the magnified region will become partially or fully obscured by the user's finger. In other words the magnified region "avoids" a user's finger.

To determine where the user's finger is, and how the magnified region 462 is to be updated (the content of the magnified region and/or its position on the game board), interpolation techniques may be used. For example a prediction algorithm may predict in which direction a user is likely to move their finger. This may be based upon information including a direction that the user's finger is currently moving. It may also use information such as letter information of tiles that have already been selected, in which case it may predict which word the user is attempting to spell. This minimises delays between the user moving their finger on the game board 100, and the content of the magnified region 462 being updated and/or of the magnified region 462 being relocated relative to the user's finger and game board. This provides a fluid feel to the way in which the magnified region is updated and/or moved. That is an interpolation technique may be used to calculate an updated position for the magnified region 462. An interpolation technique may be used to determine an updated content of the magnified region 462. An algorithm used for displaying movement of the magnified region on the screen may operate as follows:

determine a target position for the magnified region. The target position is the position towards which the magnified region moves in order to avoid the player's finger.

move the magnified region from its current position towards the target in a smooth manner. This may use an interpolation technique.

These steps may be executed on each frame.

The magnified region may follow a linear path when moving. Alternatively the magnified region may follow a non-linear path when moving. The movement of the magnified region may also comprise a mixture of linear and non-linear components. The path followed by the magnified region may be dependent upon a detected input of the user's finger. A speed of movement of the magnified region may be dependent upon a detected input of the user's finger.

Determining a movement of the user's finger may comprise receiving and/or using information of movement of the user's finger comprising one or more of: directional information; speed information; positional information; whether the movement is linear or non-linear etc.

For example if the user moves their finger quickly the magnified region may also move quickly. If the user moves their finger slowly then the magnified region may also move slowly. The path followed by the magnified region may depend on directional information of the user's finger. For example such directional information may include information such as whether the user's finger is moving towards or away from an existing position of the magnified region. The directional information may also comprise information of an angle at which the user's finger is moving relative to an existing position of the magnified region.

The algorithm may also be configured to enable the location of the target position of the magnified region to be updated. In embodiments the target position can be updated after initial setting of a target position. For example the target position may initially be set to be a first position based upon information received. This initial position can then be changed, for example if a user moves their finger in a direction that differs from an initially predicted direction of movement of the user's finger. The magnified region may also follow a non-linear path if the target changes mid-flight.

In order to determine a target position of the magnified region the algorithm may check a proximity of the user's finger to the magnified region. This may be done for example by checking a distance of the user's finger from the magnified region. In some embodiments this distance may be a distance between the user's finger and a centre of the magnified region. In another embodiment this distance may be a distance between the user's finger and an edge of the magnified region.

If the user's finger comes too close to the magnified region then the magnified region is caused to move. A threshold value may be set (for example by a game developer) for the distance between selector and magnified region which is considered to necessitate a repositioning of the magnified region.

In order to determine the target location towards which the magnified region is to move, the game board may be notionally split in to sections. In one embodiment the game board is split in to four quarters of equal size: top-left, top-right, bottom-left, bottom-right. This is by way of example only and in other embodiments the game board can be split in to a different number of sections.

The target location can be set to be comprised in a section furthest and/or opposite a section comprising the user's finger. In a four quarter embodiment the "furthest" quarter may be considered to be that which is diagonally opposed to the one where the player's finger is. So if for example the player moves their finger into the top-left quarter, the target position is set into the bottom-right quarter and so on.

The magnified region can then start to move toward the new target position.

In at least one embodiment a non-linear interpolation formula is used for the movement of the magnified region. In some embodiments the movement of the magnified region is configured such that the magnified region will initially start moving slowly, accelerate to its top speed and then start decelerating when approaching the final (target) position. This technique may take into account the time passed during the frame update sequence and a maximum speed (for example in pixels per second) allowed for the magnified region. This maximum speed may also be determined by a game developer. Therefore in some embodiments the magnified region may move at a variable speed.

In some embodiments and in order to avoid distracting the user, the magnified region, once located in its target location, does not move if the user's finger passes from one quarter to another.

In some embodiments this holds true unless the user's finger comes in close proximity to the magnified region. A threshold distance may be set for this proximity. It will be understood that although the location of the magnified region may not move in this scenario, its content will still update as necessary.

This algorithm may be adapted to various board shapes and sizes by changing the number and layout of the zones to obtain the best effect.

The movement of the magnified region may therefore appear as natural and pleasant as possible for the user, thus enhancing gameplay.

FIGS. 6A to 6D describe in more detail a game board sectioning technique as discussed above.

Figure 6A:
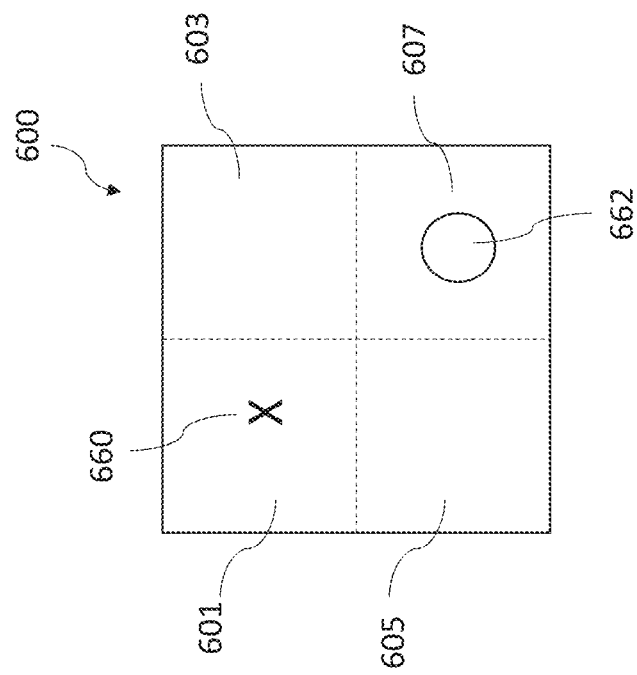
FIGS. 6A to 6D schematically show a user interface arrangement, according to some embodiments.

FIG. 6A schematically shows a game board 600 which has been sectioned in to four quarters. In FIG. 6A the four quarters are shown as segregated by dotted lines. It will be understood that this is to aid visualisation and understanding of this feature, and that in embodiments the dotted lines are not actually displayed. That is the sectioning is notional. The quarters comprise a top-left quarter 601, a top-right quarter 603, a bottom-left quarter 605, and a bottom-right quarter 607. In this embodiment the sections 601, 603, 605 and 607 are equal in size. In other embodiments the sections may be different in size. This may be the case where the game board 600 is asymmetric, for example.

Figure 6B:
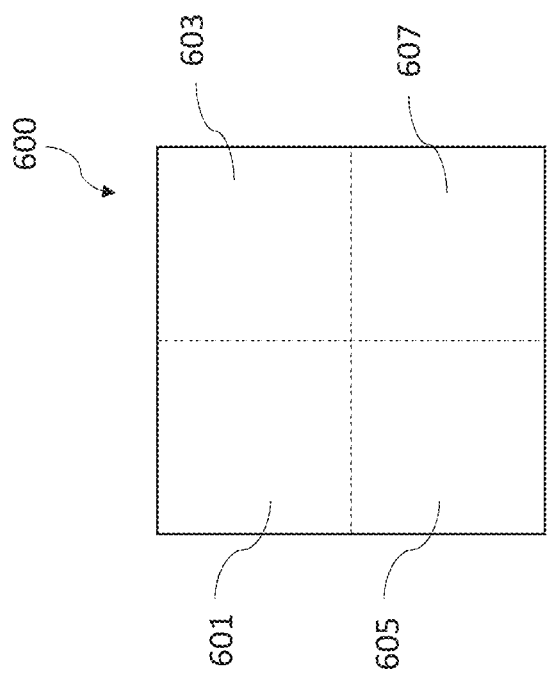

In FIG. 6B a tip of a selector is shown at 660, in top-left quarter 601. A magnified region 662 is therefore caused to be moved (if necessary), or its initial position is set to be, in a quarter or section other than the section that the tip of the selector is currently in. In this embodiment the magnified region 662 is caused to be located in bottom-right section 607. That is the magnified region 662 is caused to be in a section that is furthest from the section in which the selector 660 is located.

In FIG. 6B the magnified region 662 is shown to be located approximately centrally in section 607. In other embodiments the magnified region 662 can be caused to be located at any other point in the section 607, for example at one of its corners and/or edges.

Figure 6D:
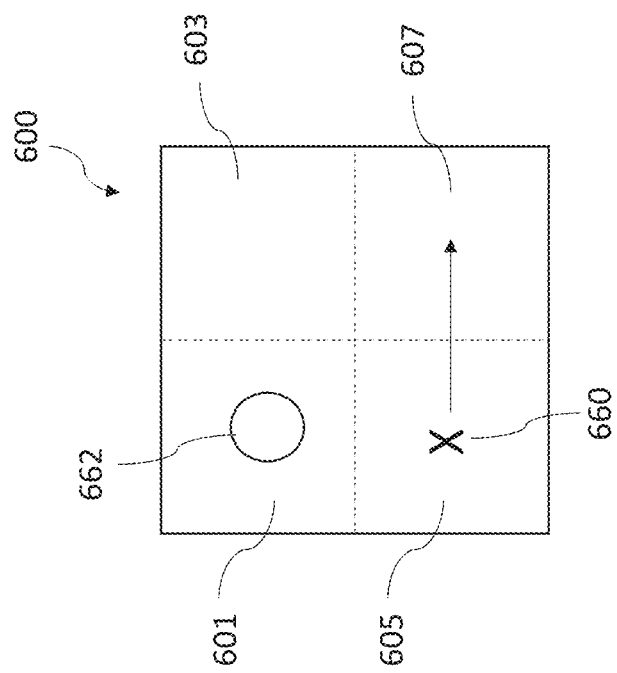
Figure 6C:
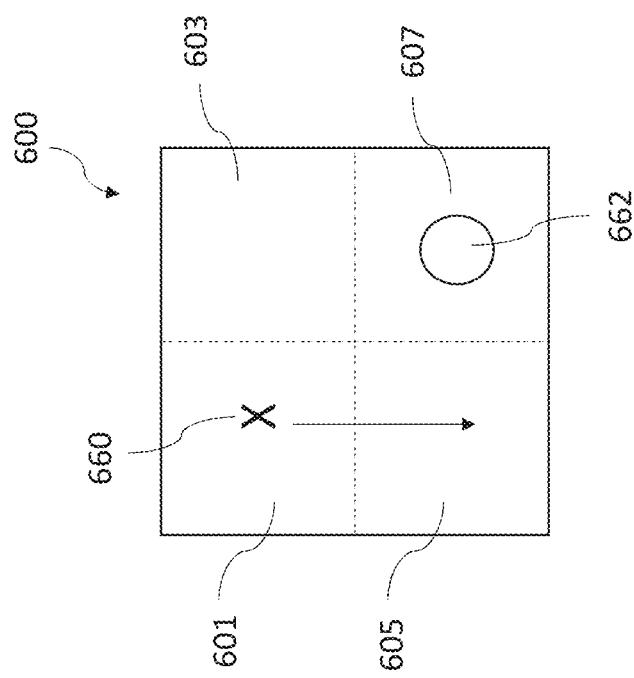

In FIG. 6C the selector is moving from section 601 to section 605. In some embodiments this may cause the magnified region to move to the section furthest from section 605. In this case that would be top-right section 603. However, and as shown in this embodiment, the magnified region 662 remains in place in section 607. This is so as not to distract the user by excessive movement of the magnified region 662. In some embodiments the magnified region is "locked" in place whilst located in any given section, such that minor movements of the selector do not cause corresponding minor movements of the magnified region 662. A threshold value may be set for a distance of movement of the selector 660 that is required before the magnified region 662 is caused to move.

As shown in FIG. 6D the selector 660 then moves from section 605 to section 607. The magnified region 662 has accordingly moved to section 601, so as to be in a different section from the selector.

Determination of a target position for the magnified region may take in to account whether a user is right or left-handed. In some embodiments a user can provide information as to whether they are right or left-handed. This may be done for example via a game options screen. For example referring back to FIG. 6B the selector 660 is shown to be in top-left quarter 601, and the magnified region 662 is caused to be in bottom-right quarter 607. However if the user is right handed, at least some of quarter 607 may be obscured by the user's hand. Therefore it may be determined that it is in fact preferable for the magnified region 662 to be positioned in another section, for example section 603 or section 605.

The game board can of course be sectioned differently. For example the game board can be sectioned in half, in thirds etc. This sectioning can operate in both portrait and landscape orientations of the game board.

The movement of the magnified region 662 can be linear or non-linear.

For example as shown in FIG. 7A the magnified region 662 can move in a linear fashion from a first position A to a second position B. This linear movement can be any one of or a combination of horizontal, vertical, or diagonal with respect to the game board.

As shown in FIG. 7B the magnified region 662 can also move in a non-linear fashion. The non-linear movement can trace any shape. In the example of FIG. 7B the non-linear movement is a curved movement. A radius of curvature r of the curve may take any value. The radius of curvature r may be dependent upon the movement of the selector. For example the radius of curvature r may take any value that is necessary for the magnified region 662 to avoid the selector.

That is a path followed by the magnified region when moving may be dependent upon a parameter of a corresponding movement of the selector. The parameter of the corresponding movement of the selector may be, by way of example only, any one or more of: speed of movement; direction of movement; acceleration of movement; distance of movement etc.

Embodiments may be realised using a render to texture technique. For example the user interface, including the game board 100, may be textured as a series of layers, enabling an upper layer (e.g. the magnified region 462) to move across and/or overlie the lower layer (e.g. game board 100). This may be implemented as a "floating mesh" on top of the scene (e.g. game board). A floating mesh can be considered a graphical element that is not tied to any other element on the display (thus "floating") and can be moved around freely. The floating mesh is a mesh in the sense that its structure is like a mesh of vertices connected together by edges (which may form a seamless block of polygons, which may be in the shape of a disc). On top of this mesh a texture is applied, for example the texture inside which the magnified region has been rendered. By way of analogy, and as will be explained in more detail below, the texture can be considered like a canvas and the mesh like a frame on to which the canvas is stretched.

In some embodiments, a program such as OpenGL can be used for the rendering of images, for example the image of the magnified region. It will be understood that this is by way of example, and that other programs can be used. The open GL API may use the following when rendering an image:
- A frame buffer in which to draw the rasterized primitives (a primitive is a geometrical construction made from vertices connected by edges, which may or may not form polygons)
- An array of primitives to process
- A projection transformation (this is the OpenGL way of expressing the relationship between the camera, the primitives and the rendering surface).

To render an image at least some of the following steps may be taken. First, some primitives may be created (defined mathematically as a set of vertices, and/or edges, and/or polygons). These primitives may use textures, which are wrapped over the skeleton of the geometry defined by the vertices and edges. By way of analogy a texture is like a canvas wrapped over a frame, where the geometry is the frame. The framebuffer can then be defined (the buffer that will contain the rendered image). Then a projection transformation can be defined (which can be computed from camera, framebuffer and world parameters). Reference here to a "camera" is to a virtual "camera" within the game. This virtual camera can determine the point of view of the player against the game board. This virtual camera may be defined by three things: a render buffer, a view transformation (camera position and orientation) in the world, and a projection transformation (this is equivalent to the characteristics of a real camera's lens—field of view, magnification factor, distortion etc.). These transformations can be represented in memory as 4×4 floating point matrices. Various OpenGL pipeline parameters can then be set. Then a command can be issued to OpenGL to process the array of primitives and render them into the framebuffer. The OpenGL API can transform, project and rasterize (turn into pixels) the primitives given to it by applying various algorithms which may be mainly implemented inside the graphics hardware.

After these operations, the framebuffer contains a 2D image. This can be presented on the screen (like the primary game graphic output is), or kept in the back-end and used as a texture for another primitive. Thus pictures within pictures can be created.

OpenGL can use any number of framebuffers provided by the programmer, so different objects or things can be rendered into different images, which may or may not be (directly or indirectly) presented to the user on the screen.

In a normal game situation, a framebuffer may exist that is the same size or approximately the same size as the screen, and all rendering goes into this framebuffer, which is then presented on the screen, frame after frame. Therefore a complete image may be in the back-end and then presented on the screen all at once.

As mentioned above, other programs using the same or similar techniques may also be used.

To obtain the effect of the magnified region (or indeed any way of providing an enlarged or magnified image) in the game the render-to-texture technique described above may be used.

In more detail, according to this technique a primitive is defined in the desired shape, to act as the skeleton for the magnified region (this will be the frame onto which the texture is applied). This may be referred to as the "magnified region mesh".

The area of the game board that is to be magnified is determined and the projection transformation is altered in such a way as to obtain the following effects:
- the rendered image will be centred on that area
- the rendered image will be larger than usual. The rendered image may also be of a higher resolution. This may be considered equivalent to "zooming-in" on the desired region.

The framebuffer may then be swapped with a second framebuffer which will hold the magnified image.

The game board can then be rendered with these settings. An enhanced image of the game board can then be obtained in the framebuffer (second framebuffer referred to above).

The old framebuffer can then be put back in place and the old projection settings can be restored.

The magnified region mesh can be positioned within the game scene, and the second framebuffer which was updated previously can be set as a texture on this mesh.

The entire game scene can then be rendered, obtaining in the primary framebuffer an image of the scene with the magnified region on top, displaying a small enhanced portion of the game board at a greater scale. This final image is then presented to the screen.

It will be understood that the methods described above can equally be applied to initial positioning of the magnified region 462 with respect to the game board 100, as well as movement of the magnified region from a first position to a second position.

Figure 8:
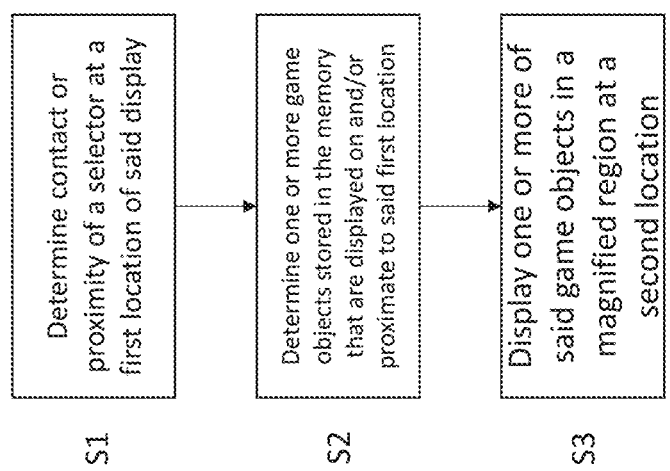
FIG. 8 is a flowchart of a method, according to an embodiment.

FIG. 8 shows a flowchart of a method according to at least one embodiment.

As a pre-cursor to FIG. 8, a game board may be generated and displayed on a display, for example in a manner similar or the same as in FIG. 1.

At step S1, contact or proximity of a selector at a first location of said display is determined.

At step S2, and in response to the determining of step S1, one or more game objects stored in the memory that are displayed on and/or proximate to said first location are determined.

At step S3, one or more of said game objects that are displayed on and/or proximate to said first location are caused to be displayed on said display in a magnified region at a second location. The second location is spaced from the first location.

As discussed above, a user may have a finite number of moves available within a game. As shown for example in FIG. 1, at 120*b* a user is shown to have 10 moves remaining. When a user runs out of moves then the game is over. In some embodiments, the user can send or transfer "moves" to another user. For example this may take place in an online environment where users can connect with each other. For example, a first player (P1) may have run out of moves (i.e. has zero moves left). A second player (P2) may have, for example, 15 moves left. P2 may choose to give P1 5 moves, meaning that P1 will now have 5 moves and P2 will have 10 moves remaining. In some embodiments the number of moves that a player can transfer to another player is only limited by the number of moves that the giving player has.

In other embodiments the number of moves that can be transferred is limited. For example the game may limit the number of transferable moves to three. It will of course be appreciated that these numbers are by way of example only, and the number of transferable moves may be more than or fewer than 3. It will also be appreciated that moves can be transferred to a player who still has some moves remaining—that is a player does not have to have run out of moves before they can receive new moves.

Figure 9:
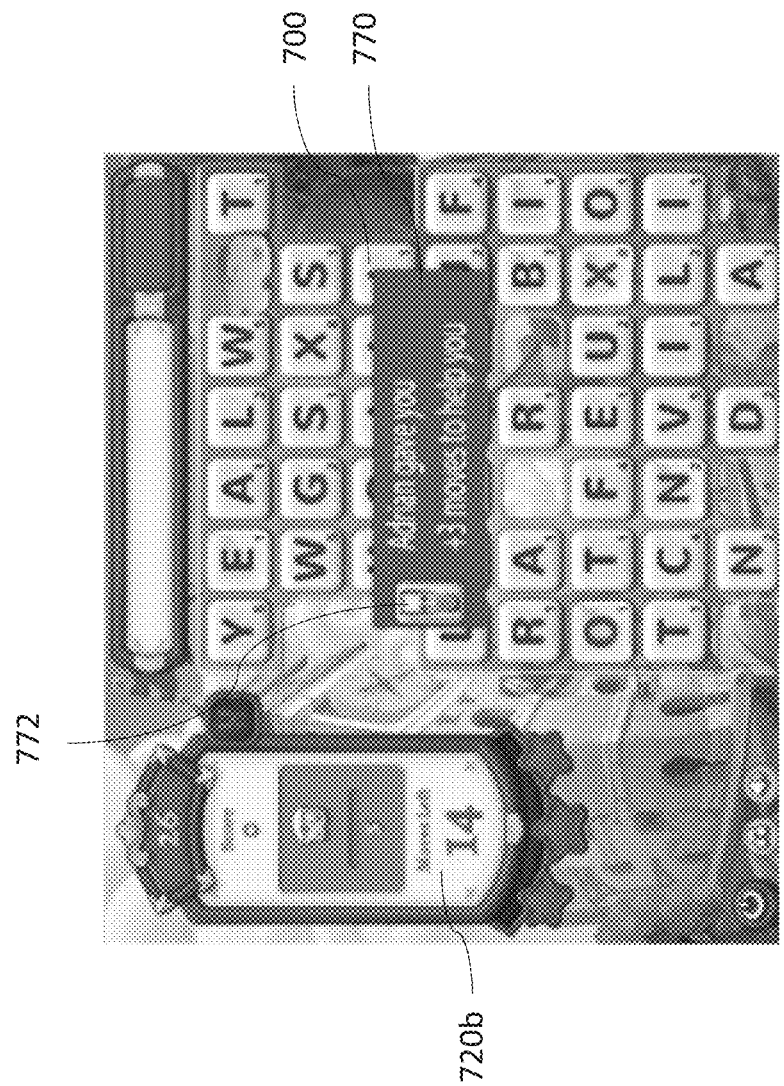
FIG. 9 shows a user interface according to another embodiment.

FIG. 9 shows an example game board 700. As shown at 720b the user has 14 moves left. As shown at 770 a "pop-up" 770 has appeared that states "Adrian gave you +3 moves to help you". A photo of the other player (Adrian) is also provided at 772. It will of course be appreciated that any image can be provided at 772, which may be uploaded by the user. If the user has not uploaded their own image then a default image may be provided. The pop-up 770 may simply appear on screen, or it may move on to the screen in another way. For example the "pop-up" may slide on to the screen from one of the sides or top or bottom of the screen. The pop-up 770 may also animate in some manner into the region 720b to give the effect of the "moves" being transferred to the "moves left" section 720b. The "moves left" section 720b may also animate in some way to show the number of moves increasing e.g. the number may spin or expand and contract, or animate in any other way to draw the user's attention to this area of the screen and to help inform the user that their number of moves has increased.

Figure 10:
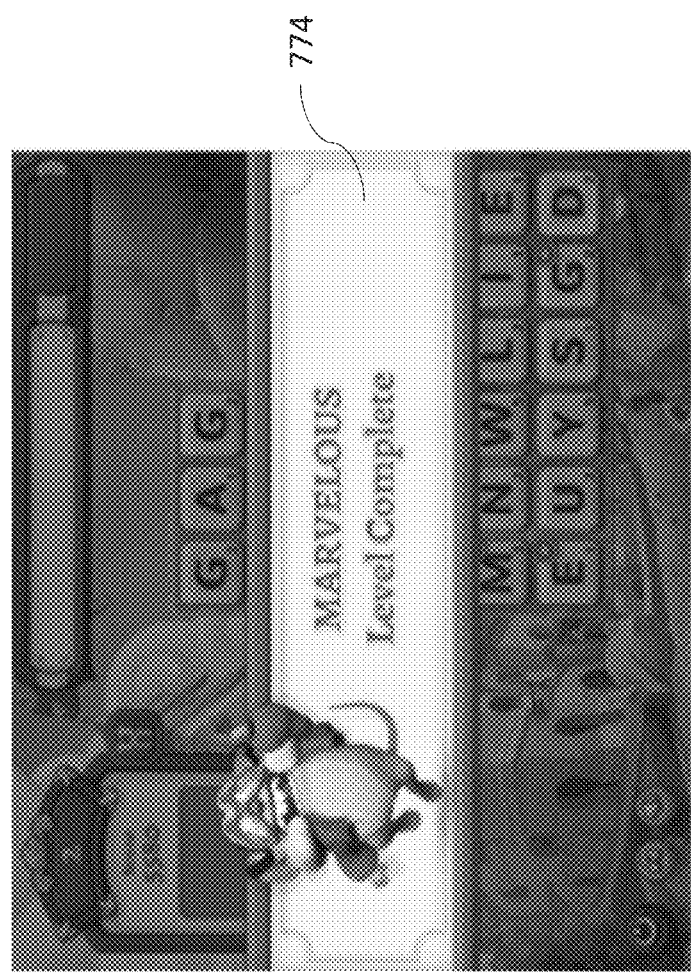
FIG. 10 shows an in-game pop-up screen, according to an embodiment.

The pop-up 770 may appear when the level is first loaded up, especially if the other player (e.g. Adrian) transferred the moves at a time when the current player was offline or not playing the game. The pop-up 770 could also appear mid-game, for example if the other player transferred moves at that time. FIG. 10 shows a game screen when a level has been completed. A new pop-up 774 is shown which states "MARVELOUS Level Complete".

Figure 11:
FIG. 11 shows an in-game pop-up screen, according to an embodiment.

Following this, a further game screen such as that shown in FIG. 11 is presented to the user. In this Figure a pop-up 776 is shown which reminds the user that another player (Adrian) helped the current user complete the level by providing 3 lives. The pop-up 776 also comprises the image icon 772 which is an image of the other player in question (Adrian), and a text portion 777 stating "Adrian helped you complete this level Be a sport and return the favor!". There is also a selectable icon 778 which enables a user to send moves back to Adrian. In this example the icon 778 states "Send +3 Moves". In some embodiments the icon 778 is configured to prompt the current user to send to the other user the same number of lives that were received by the current user from the other user.

Figure 12:
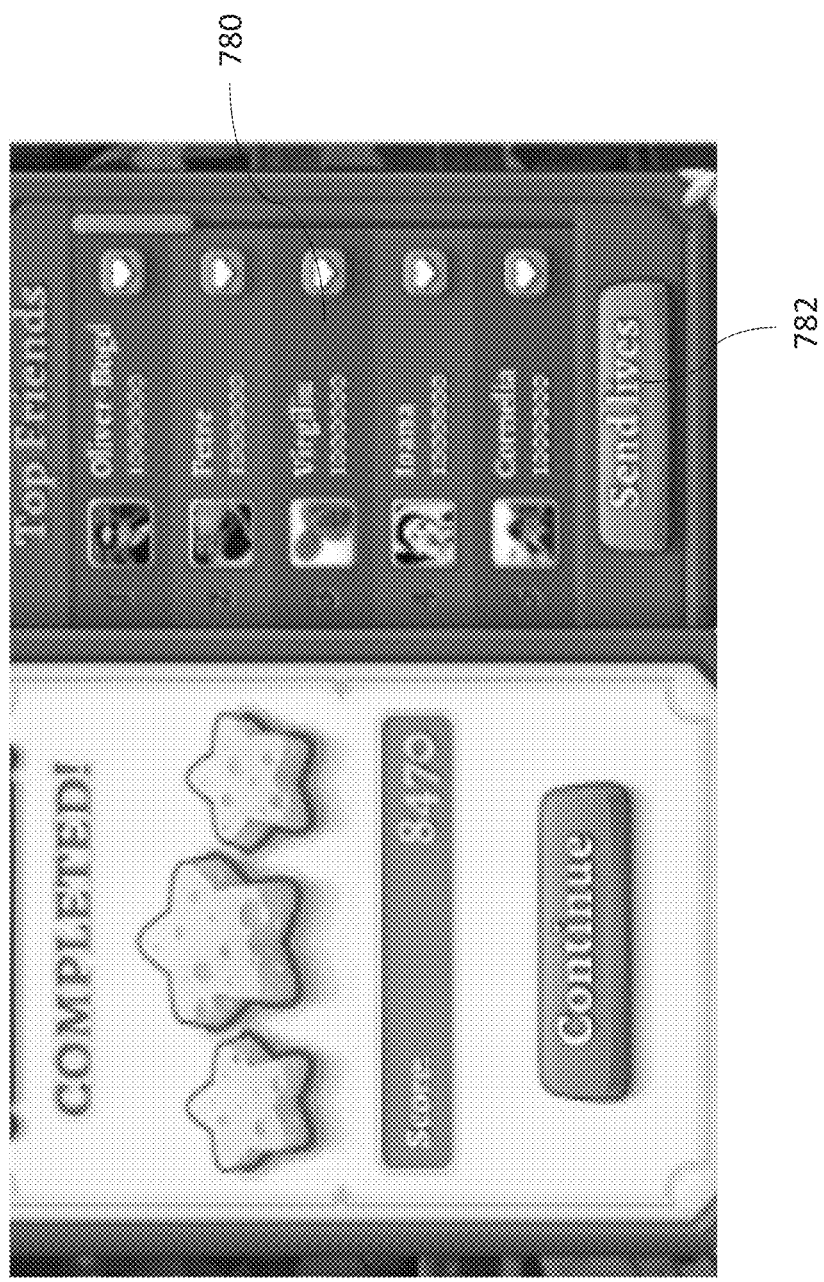
FIG. 12 shows a user-interface screen, according to an embodiment.

A further screen, as shown for example in FIG. 12, allows a user to also send lives to other users that the current user is in contact with. For example the current user can select one or more contacts from the list region which shows "Top Friends", and send lives to those users by clicking the "Send lives" icon 782. The screen shown in FIG. 12 may be provided in addition to or alternatively to the screen shown in FIG. 11. In some embodiments the current user is also able to send lives to and receive lives from users that they are not already in contact with. This may help a user to increase their number of contacts and make the game more socially enjoyable for the user. Furthermore, game play and game enjoyment may be enhanced since a user may be able to get further into or complete the game with assistance from the received lives.

Figure 13:
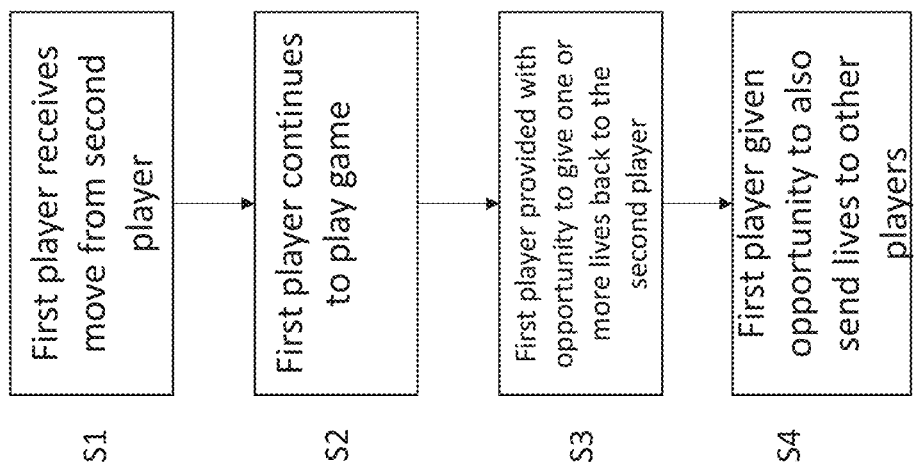
FIG. 13 shows a flow chart of a method, according to an embodiment.

FIG. 13 is a flowchart according to some embodiments. At step S1 a first player (P1) receives moves from a second player (P2).

The first player then continues to play the game until they complete the level at step S2.

At step S3 the first player is provided with an opportunity to give one or more lives back to the second player. In an optional step S4 the first player is given an opportunity to also send lives to other players.

Figure 14:
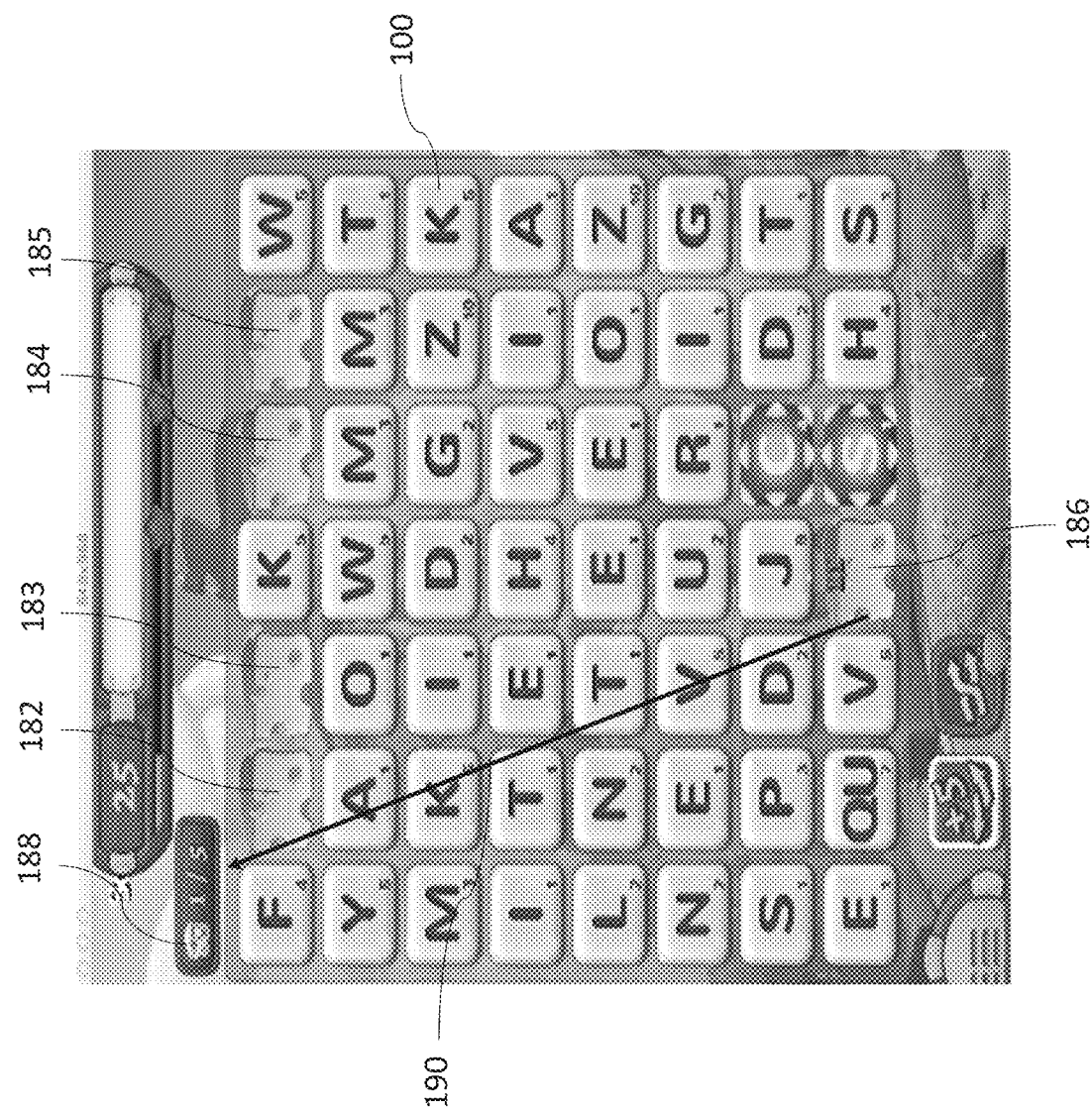
FIG. 14 shows a user-interface screen, according to an embodiment.
Figure 15:
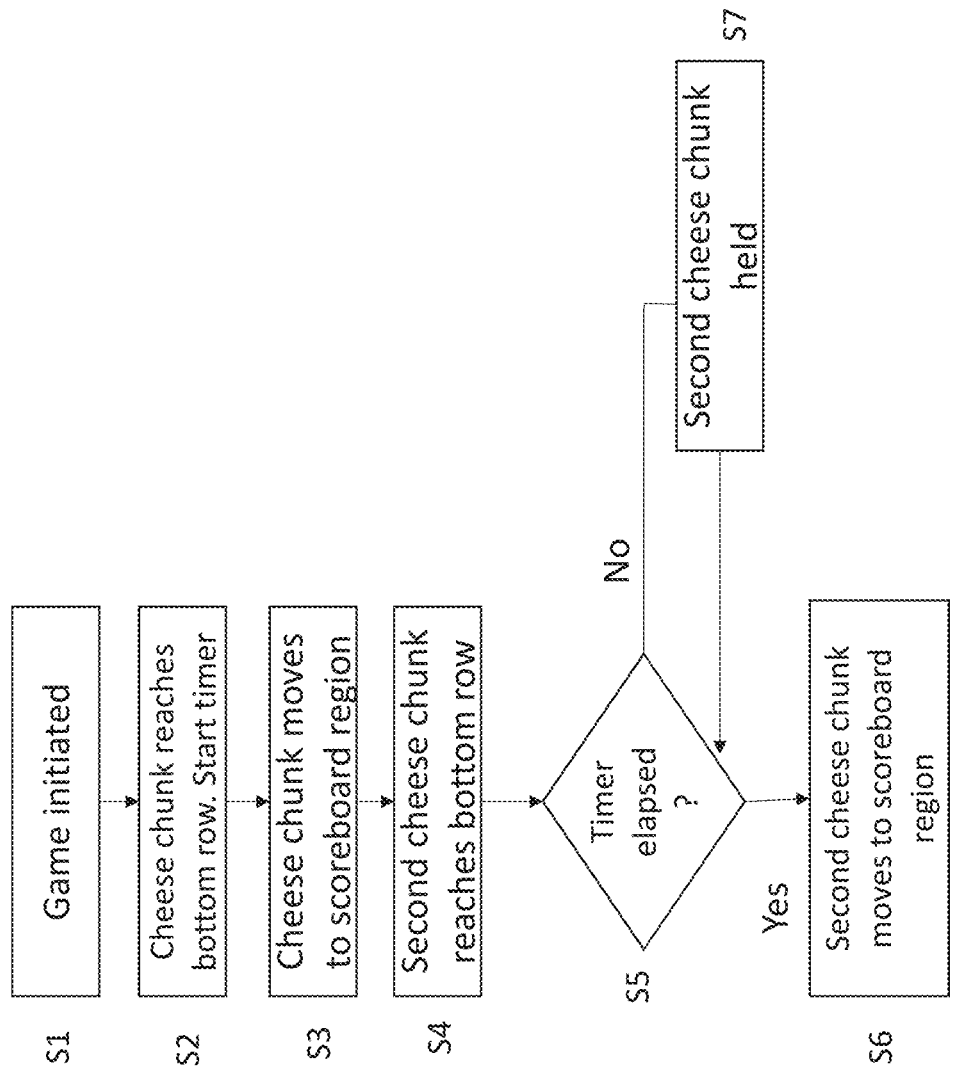
FIG. 15 shows a flow chart of a method, according to an embodiment.

Aspects of a "cheese falls" game is explained in more detail with respect to FIGS. 14 and 15.

FIG. 14 shows a game board 100 comprising in a top row of the game board four cheese icons or tiles 182, 183, 184 and 185. Other numbers of cheese icons may be provided. It will also be appreciated that a cheese icon is just one example of such an icon that could be used in a "falls" game. An aim is to get the cheese icons to the bottom row by removing letters below the cheese icons by spelling words in the manner described previously. In the game board shown in FIG. 14 one cheese icon 186 has just reached the bottom row of the game board. When this occurs a scoreboard region 188 is updated to show the current score. In this game the aim is to get five cheese icons to the bottom of the game board 100, and the user has thus far achieved a score of 1 out of 5. When a cheese icon reaches the bottom of the game board 100, the cheese icon is animated to show it "flying" up to the scoreboard 188, as represented by arrow 190. This helps the user to understand the link between the cheese icon reaching the bottom of the game board 100 and the score being updated.

It will be appreciated that it is possible for more than one cheese icon to drop to the bottom row simultaneously, for example if a plurality of bottom row tiles below a plurality of cheese icons are removed from the game board at the same time. In embodiments, when this occurs, the cheese chunks which have simultaneously fallen to the bottom row of the game board move sequentially towards the scoreboard 188. That is a first cheese chunk flies up to the scoreboard, and then a delay is set between each subsequent cheese chunk that flies up to the scoreboard. This enables the user to easily see how their score is being incremented, and thus enhances gameplay. It also improves the look and feel of the game, compared to the cheese chunks all flying up to the scoreboard region together. The delay between a first cheese chunk and a second cheese chunk moving towards the scoreboard 188 can be any length of time, however it is preferably a relatively short amount of time (e.g. less than 0.5 s, and preferably less than 0.25 s).

To enable this aspect of the game, a timer or counter may be provided. When a first cheese chunk is launched towards the scoreboard area 188, then the timer is started. A threshold value is set for the timer, and when the next cheese chunk is due to be launched a check is made with respect to the timer. If a time elapsed since the first cheese chunk was launched is less than the threshold, then the second cheese chunk is not launched until after this threshold value has elapsed. If the threshold has already elapsed when the second cheese chunk is due to be launched, then that chunk can be launched. The counter is reset each time a new cheese chunk is launched. As set forth above this has the effect of adding a delay between successive cheese launches. This not only makes the gameplay more readily understood by a user, it also simplifies how some of the processing is implemented. Launching the cheese icons in a sequential manner and updating the scoreboard in an incremental manner can in some embodiments ease the processing requirement on the computing hardware compared to when the process is implemented simultaneously. This may reduce the likelihood of the game "crashing".

FIG. 15 is a flowchart according to some embodiments.

At step S1 a cheese falls game is initiated. The game proceeds and at step S2 a cheese chunk reaches the bottom row of the game board. At step S3 the cheese chunks begins to "fly" towards the scoreboard region, and a timer is started. At step S4 a second cheese chunk reaches the bottom of the scoreboard. At step S5 a determination is made as to whether the timer has reached a threshold time. If the timer has reached or exceeded the threshold time then at step S6 the second cheese chunk moves towards the scoreboard and the scoreboard is incremented.

If at step S5 it is determined that the threshold time has not been reached, then at step S7 the cheese chunk in question is held or delayed until the threshold has elapsed.

If two or more cheese chunks reach the bottom simultaneously, then the algorithm may be configured to simply select one of the cheese chunks to be the first to be launched, one of the cheese chunks to be the second to be launched etc. For example where there is a row of cheese chunks, the left-most cheese chunk may be assigned to be the first cheese chunk, the second left-most cheese chunk on the game board may be assigned the second cheese chunk etc. Other formations may also be configured e.g. starting with the right-most cheese chunk, or starting with the middle cheese chunk in which case the cheese chunks may fly to the scoreboard region in a spearhead formation.

Figure 16:
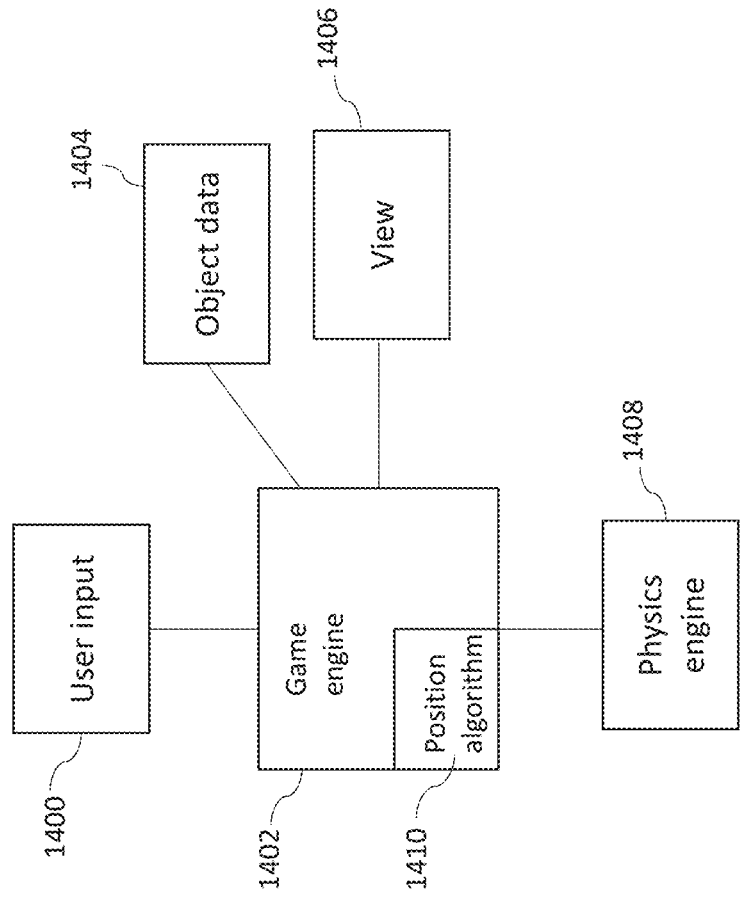
FIG. 16 shows schematically the functional blocks of an embodiment.

Reference is made to FIG. 16 which schematically shows the functional blocks of an embodiment, which may enable the game play described above. A user input block 1400 is shown. This captures the user input and feeds the input to a game engine 1402. In the context of the Alphabetty game of some embodiments, this user input may be which tiles are selected by a user and in which direction. This user input can be via any suitable user interface, such as discussed earlier.

The game engine 1402 will process the information provided by the user input. The game engine 1402 (for example a game model) will determine if a valid combination has been made.

Each object (e.g. letter tile) has object data associated therewith. The object data 1404 may be stored in any suitable memory location. In some embodiments, the object data may be considered to be part of the game engine and in other embodiments may be considered to be outside the game engine. The object data may provide information as to the properties of an object. These properties can include attribute information such as color and/or whether or not an object has a particular function such as a so-called booster function. The object data may include the position data; that is information representing the position of the object in the displayed image.

In some embodiments, the game engine will check if the game object satisfies the rule or rules for a valid match. The rule or rules which define whether or not a valid match has been made will be dependent on the game. In some embodiments, objects which have been selected will make a match if together they spell a valid word. In some embodiments, the game objects which match are removed.

Thus, the game engine will be in control of the matching mechanism. The game engine will have access to data for each tile including its position and which letter of the alphabet that tile represents, and will be able to determine if a match is made with a valid word. If a match is made, the tiles in the match are removed.

A physics engine 1408 is provided which is configured to control the movement of the falling objects. This will be an object which has been caused to move or be removed as a result of a previous match. The physics engine will generally manage the movement of an object based on for example gravity which controls the falling of the object, collision detection, when the falling object hits another object and optionally rotation calculations when the falling object rolls, for example, down the side of the other objects.

The movement of the object is thus controlled by the physics engine, which will control the movement of an object as it falls, rolls down other objects etc.

A position control block 1410 is provided. In the embodiment shown, this position control block may be part of the game engine. In other embodiments, this position control block may be outside the game engine. The position control block may be provided by a position algorithm in some embodiments.

A view function 1406 uses the object data to provide the displayed image with which the user is able to view and/or interact.

Although embodiments have primarily been discussed in relation to an Alphabetty game, it will be appreciated that the principles may be applied to other games. For example magnifying a region of a display in response to detection of contact or proximity of a selector in the manner described above may be applied to any game where visibility of selectable game objects is required. For example this may be in the context of any other kind of matching game.

In some embodiments the magnification function is provided as an option which can be selectively turned on and off by a user, for example by going through a settings screen.

Various embodiments of methods and devices have been described in the foregoing. It should be appreciated that such may be implemented in an apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It will also be understood that where reference is made to a user's finger throughout the specification, this may also apply to any other suitable selector, such as a stylus.

It is also noted herein that there are several variations and modifications which may be made to the disclosed solution without departing from the scope of the present disclosure.

The invention claimed is:

1. A computer-implemented method comprising:
   storing in a memory information of one or more game objects;
   causing to be displayed on a user interface of a touchscreen display a game board comprising one or more of said game objects;
   in response to determining contact or proximity of a selector at a first location of said touchscreen display, determining by a processor one or more of said game objects stored in said memory that are displayed on and/or proximate to said first location; and
   causing one or more of said game objects that are displayed on and/or proximate to said first location to be displayed on said touchscreen display in a magnified region at a second location, wherein said second location is spaced from said first location;

wherein said method comprises determining a region of said touchscreen display at least partially visually obscured by said selector, and displaying said game objects displayed in the magnified region outside of said at least partially visually obscured region; and updating a position of said magnified region on said display in response to movement of said selector over said game board at or above a threshold distance; and said updating the position of said magnified region comprises movement of said magnified region along a path that is curved in relation to movement of the selector, a radius of curvature of said curved path being dependent on a parameter of the movement of said selector.

2. A method as set forth in claim 1, wherein said magnified region overlies or at least partially overlies said game board.

3. A method as set forth in claim 2, wherein the method comprises texturing said user interface as a series of layers, the game board comprised in a first layer and the magnified region comprised in a second layer.

4. A method as set forth in claim 1, wherein said first location of said game board is represented at a central position of said magnified region.

5. A method as set forth in claim 1, comprising determining said second location in dependence on said first location.

6. A method as set forth in claim 1, wherein the game board comprises a plurality of sections.

7. A method as set forth in claim 6, wherein the second location is caused to be in a second section different from a first section comprising the first location.

8. A method as set forth in claim 1, comprising updating a content of said game objects displayed in said magnified region in response to movement of said selector over said game board.

9. A computer program product embodied on a non-transitory computer-readable medium comprising computer executable instructions which when run on one or more processors perform:
storing in a memory information of one or more game objects;
causing to be displayed on a user interface of a touchscreen display a game board comprising one or more of said game objects;
in response to determining contact or proximity of a selector at a first location of said touchscreen display, determining by a processor one or more of said game objects stored in said memory that are displayed on and/or proximate to said first location; and
causing one or more of said game objects that are displayed on and/or proximate to said first location to be displayed on said touchscreen display in a magnified region at a second location, wherein said second location is spaced from said first location;
wherein said method comprises determining a region of said touchscreen display at least partially visually obscured by said selector, and displaying said game objects displayed in the magnified region outside of said at least partially visually obscured region; and updating a position of said magnified region on said touchscreen display in response to movement of said selector over said game board at or above a threshold distance; and
said updating the position of said magnified region comprises movement of said magnified region along a path that is curved in relation to movement of the selector, a radius of curvature of said curved path being dependent on a parameter of the movement of said selector.

10. A method as set forth in claim 1, wherein the method comprises determining whether a user is left or right-handed, and determining a target position for the magnified region on the game board in response to the determination of whether the user is left or right-handed.

11. A method as set forth in claim 1, further comprising determining, via a processor, locations of a plurality of sections within the game board.

12. A device comprising:
a memory for storing information of one or more game objects;
a touchscreen display for displaying on a user interface a game board comprising one or more of said game objects;
a processor;
the device configured to, in response to determining contact or proximity of a selector at a first location of said touchscreen display, determine by the processor one or more of said game objects stored in said memory that are displayed on and/or proximate to said first location; and
cause one or more of said game objects that are displayed on and/or proximate to said first location to be displayed on said touchscreen display in a magnified region at a second location, wherein said second location is spaced from said first location;
wherein said device is configured to determine a region of said display at least partially visually obscured by said selector, and display said game objects displayed in the magnified region outside of said at least partially obscured region; and update a position of said magnified region on said touchscreen display in response to movement of said selector over said game board at or above a threshold distance; and
wherein said device is configured to update the position of said magnified region comprising moving said magnified region along a path that is curved in relation to movement of the selector, a radius of curvature of said curved path being dependent on a parameter of the movement of said selector.

13. A device as set forth in claim 12, wherein said device is configured to cause said magnified region to overlie or at least partially overlie said game board.

14. A device as set forth in claim 13, wherein the device is configured to texture said user interface as a series of layers, the game board comprised in a first layer and the magnified region comprised in a second layer.

15. A device as set forth in claim 12, wherein said device is configured to represent said first location of said game board at a central position of said magnified region.

16. A device as set forth in claim 12, wherein the device is configured to determine said second location in dependence on said first location.

17. A device as set forth in claim 12, wherein the device is configured to consider the game board as comprising a plurality of sections.

18. A device as set forth in claim 17, wherein the device is configured to cause the second location to be in a section different from a section comprising the first location.

19. A device as set forth in claim 12, the device configured to update a content of said game objects displayed in said magnified region in response to the movement of said selector over said game board.

* * * * *